US010192298B2

(12) United States Patent
Harding et al.

(10) Patent No.: US 10,192,298 B2
(45) Date of Patent: Jan. 29, 2019

(54) SYSTEM AND METHOD FOR MONITORING TAPE ENDS OF A COMPOSITE LAYUP MACHINE

(71) Applicant: General Electric Company, Schenectady, NY (US)

(72) Inventors: Kevin George Harding, Niskayuna, NY (US); Christopher Allen Nafis, Rexford, NY (US); Robert William Tait, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 533 days.

(21) Appl. No.: 14/690,700

(22) Filed: Apr. 20, 2015

(65) Prior Publication Data
US 2016/0307310 A1 Oct. 20, 2016

(51) Int. Cl.
*B29C 70/38* (2006.01)
*G06T 7/00* (2017.01)
*B29L 7/00* (2006.01)

(52) U.S. Cl.
CPC .......... *G06T 7/0004* (2013.01); *B29C 70/386* (2013.01); *B29L 2007/007* (2013.01); *G06T 2207/30108* (2013.01)

(58) Field of Classification Search
CPC ..... B29C 70/38; B29C 70/382; B29C 70/384; B29C 70/386; B29C 70/388; G06T 7/0004; G06T 2207/30108; B29L 2007/007
USPC .......................... 156/361, 367, 368, 378, 379
See application file for complete search history.

(56) References Cited

U.S. PATENT DOCUMENTS

| 4,591,402 A | 5/1986 | Evans et al. |
|---|---|---|
| 4,799,981 A | 1/1989 | Stone et al. |
| 5,562,788 A | 10/1996 | Kitson et al. |
| 7,536,235 B2 | 5/2009 | Hagen |
| 7,807,002 B2 | 10/2010 | Engelbart et al. |
| 7,835,567 B2 | 11/2010 | Oldani |
| 8,158,210 B2 | 4/2012 | Kramp |

(Continued)

FOREIGN PATENT DOCUMENTS

| WO | 2009089814 A1 | 7/2009 |
| WO | 2012164184 A1 | 12/2012 |

OTHER PUBLICATIONS

European Search Report and Opinion issued in connection with corresponding EP Application No. 6165201.1 dated Sep. 20, 2016.

(Continued)

*Primary Examiner* — George R Koch
(74) *Attorney, Agent, or Firm* — GE Global Patent Operation; Nitin Joshi

(57) ABSTRACT

A device for identifying an end of a fiber tape rolling over a composite structure is presented. The device includes a light source disposed proximate to the composite structure and configured to project a line of light at a first angle on the fiber tape rolling over the composite structure. Also, the device includes an image capturing unit disposed proximate to the composite structure and configured to capture an image of the line of light on the fiber tape at a second angle. Further, the device includes a controller coupled to the image capturing unit and configured to process the captured image to detect a discontinuity in the line of light on the fiber tape and identify the end of the fiber tape based on the detected discontinuity in the line of light on the fiber tape.

7 Claims, 11 Drawing Sheets

(56) References Cited

U.S. PATENT DOCUMENTS

| | | |
|---|---|---|
| 8,557,074 B2 | 10/2013 | McCowin |
| 2005/0240291 A1 | 10/2005 | Oldani et al. |
| 2007/0277919 A1 | 12/2007 | Savol et al. |
| 2008/0055591 A1* | 3/2008 | Walton ............... G01N 21/8901 356/237.1 |
| 2009/0043533 A1* | 2/2009 | Brennan ................ B29C 70/32 702/152 |
| 2009/0199948 A1 | 8/2009 | Kisch |
| 2009/0243128 A1 | 10/2009 | Nelson et al. |
| 2012/0247643 A1 | 10/2012 | Kramp |
| 2014/0027065 A1 | 1/2014 | McCowin |
| 2014/0028831 A1 | 1/2014 | Cayment et al. |
| 2014/0081444 A1 | 3/2014 | Rudberg et al. |

OTHER PUBLICATIONS

Liu Lin et al., "PMAC-based Tracking Control System for 8-axis Automated Tape-laying Machine", Chinese Journal of Aeronautics, ScienceDirect, vol. 22, Issue 5, pp. 558-563, Oct. 2009.
Krombholz et al., "Advanced automated fibre placement", Conference: International Conference on Manufacturing Research, vol. 11, May 29, 2014.

* cited by examiner

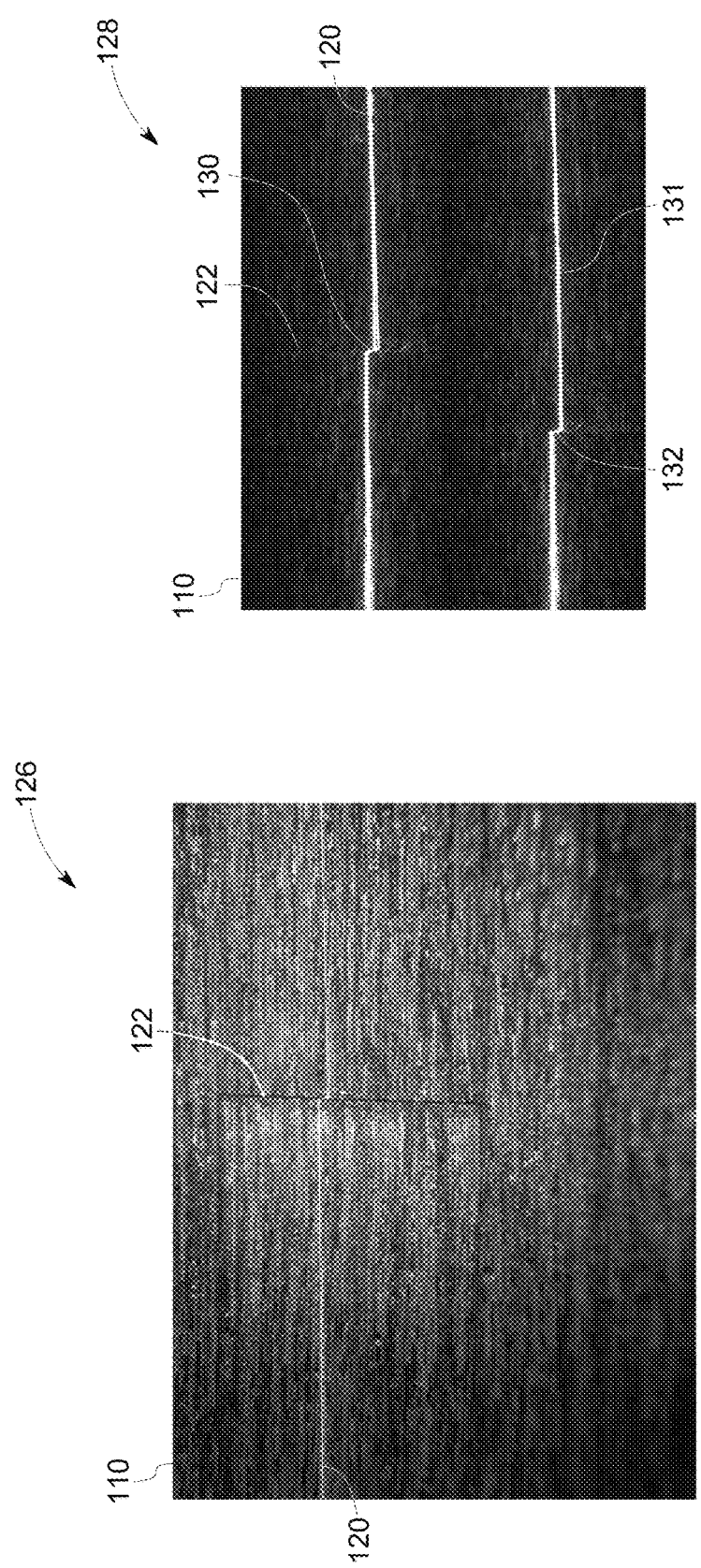

SYSTEM AND METHOD FOR MONITORING TAPE ENDS OF A COMPOSITE LAYUP MACHINE

BACKGROUND

Embodiments of the present specification relate generally to a composite layup machine, and more particularly to a system and method for monitoring tape ends of the composite layup machine.

Composite layup machines are used to fabricate composite structures, such as aircraft wings, fan casing, and fuselages in aerospace, automotive, marine, and other industries. Typically, the composite layup machine moves over a layup surface of the structure to place strips of fiber carbon material, known as tapes, on the layup surface. The composite layup machine may make multiple passes over the layup surface in a pre-defined pattern, building up layers of the tape until a layup has been formed.

In general, the tapes are repeatedly rolled over the surface of the structure at different angles to maximize the strength of the structure. Also, it is important to place the tapes at a correct position on the surface of the structure to improve the strength and quality of the structure. In some instance, the layup machine may slip and may take offset by a millimeter. This in turn causes the layup machine to place the tapes at an incorrect position on the surface of the structure. Also, there may be other errors, such as twists in the tapes and splice breaks in the tapes that may cause the tapes to be placed at an incorrect position on the surface of the structure. Further, this incorrect positioning of tapes on the structure may cause bulging and may reduce the strength of the structure. Also, there may be bad spots in the final product of the structure. Thus, it is very important to monitor the placement of tapes on the structure.

In existing systems, an operator visually identifies the location of tape ends on the surface of the structure while the layup machine places the tape over the structure. Further, the operator visually inspects the tape ends to verify whether the tape is placed at the correct position on the surface of the structure. However, this layup process requires the operator to stand at the layup machine and continously watch the operation. Also, it is very difficult for the operator to visually identify the location of tape ends for each layer on the structure as the tape ends are below the layup machine. Additionally, the fiber nature of the tape may make the tape surface appear bright in some orientations and very dark in other. This in turn makes it difficult for the operator to visually find the actual edge or end of the tape. Moreover, by the time the operator identifies the error in placing the tape, multiple layers may be laid down on the incorrect tape. This in turn causes the operator to stop the layup machine and peel all the layers that are above the incorrect tape, which is a tedious and time consuming process. Moreover, finding a error tape that is buried deep in the structure may prove to be very difficult and expensive to repair. Also, peeling all the layers that are above the incorrect tape and relaying new tapes may increase the material cost and labour cost for fabricating the composite structure.

Thus, there is a need for a system and method to automatically detect the location of tape ends and monitor the placement of tape ends on the composite structure.

BRIEF DESCRIPTION

In accordance with aspects of the present specification, a device for identifying an end of a fiber tape rolling over a composite structure is presented. The device includes a light source disposed proximate to the composite structure and configured to project a line of light at a first angle on the fiber tape rolling over the composite structure. Also, the device includes an image capturing unit disposed proximate to the composite structure and configured to capture an image of the line of light on the fiber tape at a second angle. Further, the device includes a controller coupled to the image capturing unit and configured to process the captured image to detect a discontinuity in the line of light on the fiber tape and identify the end of the fiber tape based on the detected discontinuity in the line of light on the fiber tape.

In accordance with a further aspect of the present specification, a method for identifying an end of a fiber tape rolling over a composite structure is presented. The method includes projecting, by a light source, a line of light at a first angle on the fiber tape rolling over the composite structure. Also, the method includes capturing, by an image capturing unit, an image of the line of light on the fiber tape at a second angle. Further, the method includes processing, by the controller, the captured image to detect a discontinuity in the line of light on the fiber tape. In addition, the method includes identifying the end of the fiber tape based on the detected discontinuity in the line of light on the fiber tape.

In accordance with another aspect of the present specification, a device for identifying an end of a fiber tape rolling over a composite structure is presented. The device includes a light source disposed proximate to the composite structure and configured to project at least two lines of light at a first angle on the fiber tape rolling over the composite structure. Also, the device includes an image capturing unit disposed proximate to the composite structure and configured to capture an image of the at least two lines of light on the fiber tape at a second angle. Further, the device includes a controller coupled to the image capturing unit and configured to process the captured image to select a pair of points among a plurality of pairs of points associated with a discontinuity in the two lines of light in the captured image, determine an angle of a line connecting the selected pair of points in the captured image, and detect the end of the fiber tape when the determined angle of the line is collinear to a predetermined orientation of the fiber tape laying over the composite structure.

In accordance with yet another aspect of the present specification, a method for identifying an end of a fiber tape rolling over a composite structure is presented. The method includes projecting, by a light source, at least two lines of light at a first angle on the fiber tape rolling over the composite structure. Also, the method includes capturing, by an image capturing unit, an image of the at least two lines of light on the fiber tape at a second angle. Further, the method includes processing, by the controller, the captured image to select a pair of points among a plurality of pairs of points associated with a discontinuity in the two lines of light in the captured image. In addition, the method includes determining an angle of a line connecting the selected pair of points in the captured image. Furthermore, the method includes detecting the end of the fiber tape when the determined angle of the line is collinear to a predetermined orientation of the fiber tape laying over the composite structure.

DRAWINGS

These and other features, aspects, and advantages of the present invention will become better understood when the following detailed description is read with reference to the accompanying drawings in which like characters represent like parts throughout the drawings, wherein:

FIG. 3 is a diagrammatical representation of an image captured by the image capturing unit, in accordance with aspects of the present specification;

FIG. 4 is a diagrammatical representation of a filtered image, in accordance with aspects of the present specification;

DETAILED DESCRIPTION

As will be described in detail hereinafter, various embodiments of exemplary systems and methods for detecting a location of a tape end on a composite structure are presented. In particular, the systems and methods presented herein aid in automatically identifying an end of each tape placed over the structure, which in turn aids in monitoring the placement of tapes over the structure. By employing the methods and the various embodiments of the systems of the present specification, time and cost for fabricating the composite structure may be significantly reduced. Also, the composite structure may be fabricated with precision, which in turn improves the quality of the structure.

Figure 1:
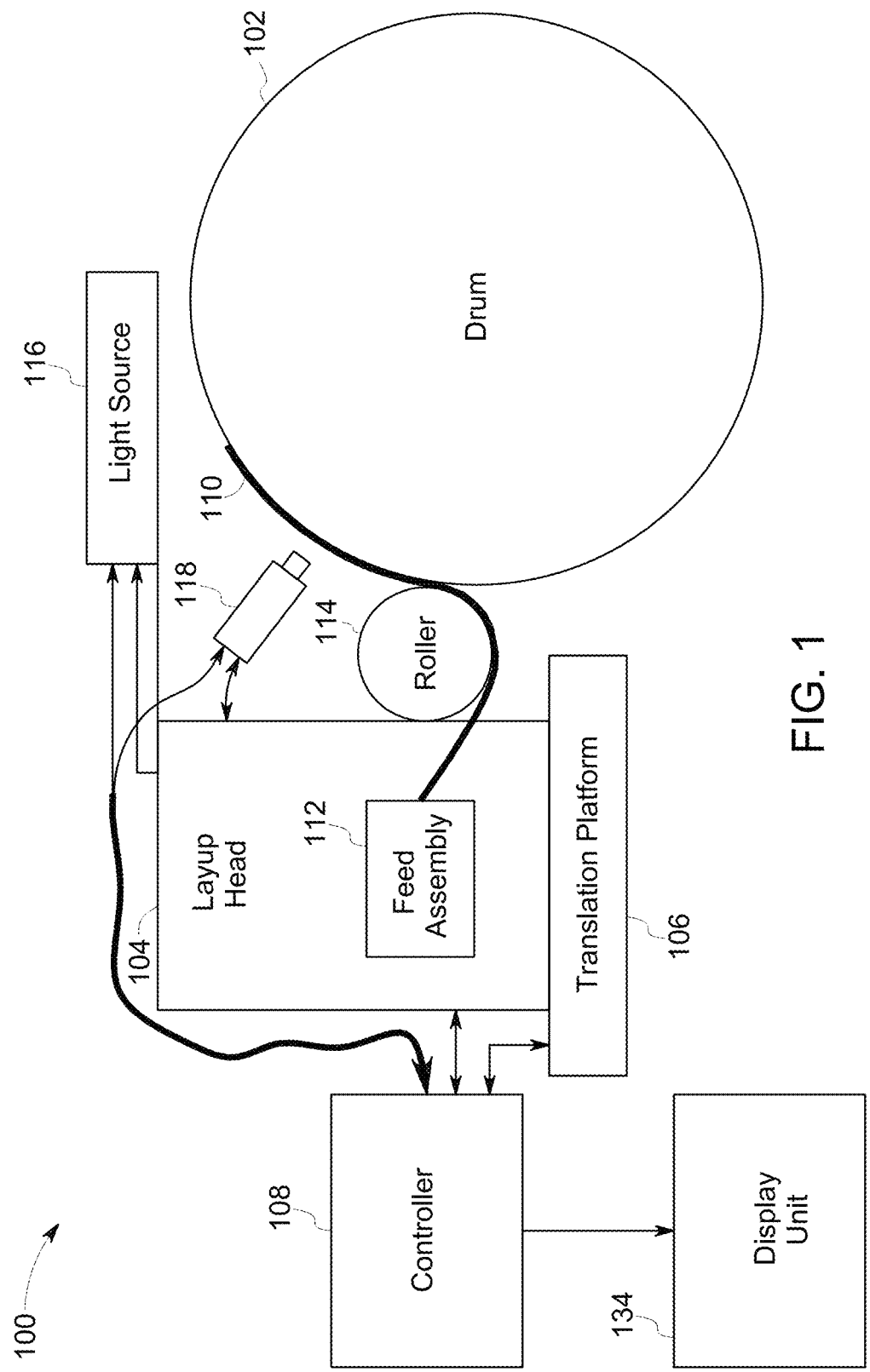
FIG. 1 is a diagrammatical representation of a composite layup machine laying tapes over a composite structure, in accordance with aspects of the present specification.

Turning now to the drawings and referring to FIG. 1, a diagrammatical representation of a composite layup machine 100 operated to fabricate a composite structure 102, in accordance with aspects of the present specification, is depicted. In general, the composite structures are widely used in aerospace, automotive, marine, and other similar industries. In the example of aerospace industry, the composite structures may be used to enclose one or more fan blades that are coupled to an engine. Particularly, the composite structures are used as fan casings for the fan blades. Typically, the composite structures are built or fabricated using layers of tape containing fibers made out of glass, carbon, or other materials. Also, these composite structures may be lighter in weight, yet as strong or stronger than metal parts.

In a presently contemplated configuration, the composite layup machine 100 may be an automated machine that is used to make the composite parts or structures. The composite layup machine 100 may include a plurality of layup heads 104, a translation platform 106, and a controller 108. It may be noted that the composite layup machine 100 may include other components, and is not limited to the components shown in FIG. 1. Each of the layup heads 104 are operatively coupled to the translation platform 106. Further, the translation platform 106 is adapted to place the layup heads 104 proximate to the composite structure 102, such as a casing or a drum. It may be noted that the terms "composite structure," "casing," and "drum" may be used interchangeably in the below description.

Further, the controller 108 may be operatively coupled to the layup heads 104 and the translation platform 106. Also, the controller 108 may be configured to send one or more control signals to the translation platform 106 to systematically move the layup heads 104 along three-dimensional paths proximate the drum 102. Moreover, each layup head 104 is operable to perform placement and consolidation of a corresponding composite fiber tape 110 to produce a composite layup over the drum 102. For ease of understanding of the invention, only one layup head 104 is depicted in FIG. 1.

Also, the layup head 104 may include a feed assembly 112 and a compression roller 114. The feed assembly 112 may be operatively coupled to the compression roller 114 and the controller 108. Also, the feed assembly 112 may include one or more spools (not shown) comprising the composite fiber tapes 110. In one example, the composite fiber tapes 110 may be formed by strands of carbon fiber material that are glued together with an uncured epoxy and sticky resin.

Furthermore, the feed assembly 112 is configured to supply the composite fiber tapes 110 from the one or more spools to the compression roller 114. Further, the compression roller 114 applies the composite fiber tapes 110 over the drum 102 to compact the composite fiber tapes 110 against the drum 102. It may be noted that the terms "composite fiber tapes" and "fiber tapes" may be used interchangeably in the below description. Further, when the fiber tapes 110 are rolled down the drum 102, the fiber tapes 110 are exposed to ultraviolet (UV) light to cure the epoxy resin on the fiber tapes 110. This in turn aids in adhering the fiber tapes 110 to the surface of the drum 102. Moreover, the fiber material in the tapes 110 is a light weight carbon material, which helps in reducing the overall weight of the drum 102 after fabrication. It may be noted that the fiber tapes 110 that are laid over the surface of the drum 102 are referred to as tows.

In the exemplary embodiment, the layup head 104 may move along the drum 102 to place the composite fiber tapes 110 over the surface of the drum 102. Also, the layup head 104 may make multiple passes over the surface of the drum 102 in a pre-defined pattern, building up layers of the fiber tapes 110 until a layup has been formed on the drum 102. In one example, the fiber tapes 110 may be repeatedly rolled over the surface of the drum 102 at different angles to maximize the strength of the drum 102. Also, each tape layer may add a layer of thickness of about a few tens of micron thick.

Moreover, the layup head 104 and the translation platform 106 are programmed to place the fiber tapes 110 at a predetermined position on the surface of the drum 102.

However, in some instance, the layup head 104 may slip and may take offset by a millimeter. This in turn causes the layup head 104 to place the fiber tapes 110 at an incorrect position on the surface of the drum 102. Further, this incorrect positioning of fiber tapes 110 on the surface of the drum 102 may cause bulging and may reduce the strength of the drum 102.

In a conventional system, an operator may manually identify the location of tape ends on the surface of the structure and may verify whether the fiber tape is placed at the correct position on the surface of the structure. However, this layup process requires the operator to stand at the layup machine and continuously watch the operation. Moreover, by the time the operator identifies the error in placing the tape, multiple layers may be laid down on the incorrect tape. This in turn causes the operator to stop the layup machine and peel all the layers that are above the incorrect tape, which is a tedious and time consuming process. Also, the error in placing the tape may cause a weak spot or a void in the finished product.

To overcome the above shortcomings or problems, the exemplary composite layup machine 100 automatically identifies the tape end when the tape 110 is placed over the surface of the drum 102 or the composite structure. Further, the composite layup machine 100 automatically determines whether the tape end is placed at a predetermined position on the surface of the drum 102. For ease of understanding the invention, a single tape is referred in the below description. Also, it may be noted that the terms "fiber tape" and "tape" may be used interchangeably.

The composite layup machine 100 includes a light source 116 and an image capturing unit 118 that are coupled to the layup head 104 and the controller 108. In one embodiment, the light source 116 and the image capturing unit 118 are mounted on the layup head 104 or the compression roller 114. Also, the light source 116 and the image capturing unit 118 are configured to move along the layup head 104 or the compression roller 114 and are always oriented correctly relative to the orientation of the tape 110 being laid down on the drum 102. In one embodiment, the light source 116 and the image capturing unit 118 may be positioned within the layup head 104. Further, as the tape 110 is laid down on the drum 102, the light source 116 may be configured to project one or more lines of light over the tape 110 that is laid on the drum 102.

Two different embodiments or approaches may be employed to identify the end of the fiber tape 110 that is laid over the drum 102. In the first embodiment, a single line of light may be projected on the fiber tape 110 to identify the end of the tape 110. In the second embodiment, multiple lines of light may be projected on the fiber tape 110 to identify the end of the tape 110. It may be noted that the first embodiment is described with reference to FIGS. 2-4, while the second embodiment is described with reference to FIGS. 5-8.

Figure 2:
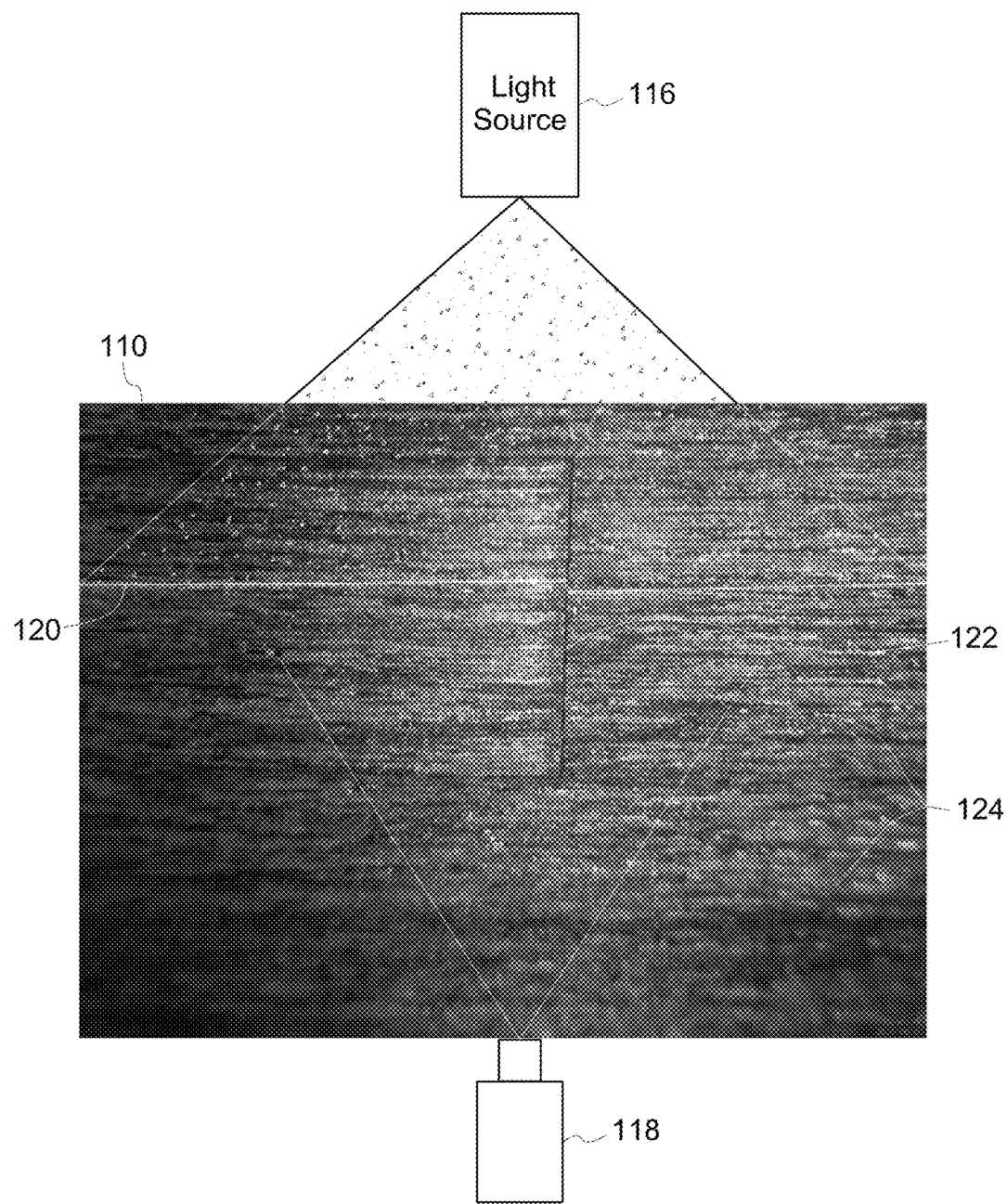
FIG. 2 is a diagrammatical representation of a light source and an image capturing unit projected over a fiber tape, in accordance with aspects of the present specification.

In the first embodiment, as illustrated in FIG. 2, the light source 116 may project a single line of light 120 from a first angle so that the line of light 120 is aligned to be substantially perpendicular to an expected tape end 122. In one example, the light source 116 may be projected from a predetermined height from the surface of the drum 102 so that the line of light 120 may follow the direction of the tape 110 being laid down on the drum 102 and substantially perpendicular to the expected tape end 122. Further, the light source 116 may include a laser device that is used to project a laser light over the tape 110.

Additionally, the image capturing unit 118 is configured to capture an image of the tape 110 from a second angle, as depicted in FIG. 2. In one embodiment, the second angle of the image capturing unit 118 may be substantially orthogonal to the first angle of the projected line of light on the tape 110. Particularly, the layup head 104 may automatically lay the tape 110 on the surface of the drum 102 and may cut the tape 110 from the rest of the tapes rolled in the feed assembly 112. Also, the layup head 104 may stop after each cut to capture one or more images of the tape 110 on the drum 102. More specifically, the image capturing unit 118 may capture a portion of the surface of the drum 102 that includes the tape 110 that is currently laid down on the drum 102 and one or more other tapes 124 (see FIG. 2) that are previously laid on the surface of the drum 102. These one or more other tapes 124 may be laid at different angles and/or on different layers on the surface of the drum 102.

Also, as illustrated in FIG. 3, the image 126 captured by the image capturing unit 118 may include the tape 110 having the line of light 120 projected on the tape 110. In one embodiment, the layup head 104 may send a first signal to the image capturing unit 118 indicating the end of the tape 110 supplied to the compression roller 114. Upon receiving the first signal, the image capturing unit 118 may start to capture the image 126 of the tape 110 on the surface of the drum 102.

After capturing the image 126, the image capturing unit 118 may communicate the captured image 126 of the tape 110 to the controller 108. Further, the controller 108 may process the captured image 126 to identify a small shift or discontinuity in the line of light 120 on the tape 110 that is laid on the drum 102. The small shift in the line of light 120 may be mainly at a location where the tape ends. In one example, as the tape ends on the drum 102, the projected line of light 120 on the tape 110 deviates from its initial straight line. Particularly, the controller 108 may include a spectral filter that eliminates features in the captured image 126 that are not associated with the line of light 120 or the laser lines. This filtered image 128 of the tape 110 is depicted in FIG. 4.

Further, as the image 128 includes multiple tapes that are laid at different angles and/or on different layers on the surface of the drum 102, the image 128 may have multiple shifts in the line of light 120. These multiple shifts in the line of light 120 may be mainly due to edges of multiple tapes on the surface of the drum 102.

In the exemplary embodiment, the controller 108 may process the image 128 to select a line of light 120 in the image 128 that fits to a line of the expected orientation of the tape 110. In one example, the controller 108 may select a line orientation and spacing in a manner that only the line shift 130 that is going across the correct tape end 122 may be fitted to the line of the expected orientation of the tape 110. Other lines of light 131 and their corresponding line shift 132 in the image 128 may not fit such a line orientation and hence, the controller 108 may eliminate or ignore those lines of lights 131 and corresponding line shifts 132 in the image 128. Further, the controller 118 selects a location on the fitted line of light 120 having the line shift 130 as the location of the tape end 122 on the surface of the drum 102. In one embodiment, the controller may employ a well know triangulation effect or other known algorithms to select the location on the fitted line of light 120 having the line shift 130.

In another embodiment, the controller 108 may process the image 128 to detect a discontinuity in the projected line of light 120 on the tape 110. Further, the controller 108 may identify the end 122 of the tape 110 based on the detected discontinuity in the line of the light 120 on the tape 110. Particularly, the controller 108 may process the image 128 to determine intensity of pixel values associated with the line of light 120 on the tape 110. Further, the controller 108 may monitor the intensity of pixel values along the line of light 120 on the tape 110. As the intensity of pixel values along the line of light 120 changes substantially, the controller 108 detects the discontinuity in the line of light 120. Also, the controller 108 may determine a location in the image 128 having the detected discontinuity in the line of light 120. This location in the image 128 is identified as a location of the end of the tape 108 on the surface of the drum 102. In one embodiment, the controller may display the captured image 126 and the filtered image 128 on a display unit 134 (see FIG. 1) coupled to the controller 108.

In the second embodiment of determining the tape end, the light source 116 may project multiple lines of light on the tape 110. For ease of understanding the invention, only two lines of light are considered in this embodiment. It may be noted that any number of lines of light may be used to determine the tape end 122.

Figure 5:
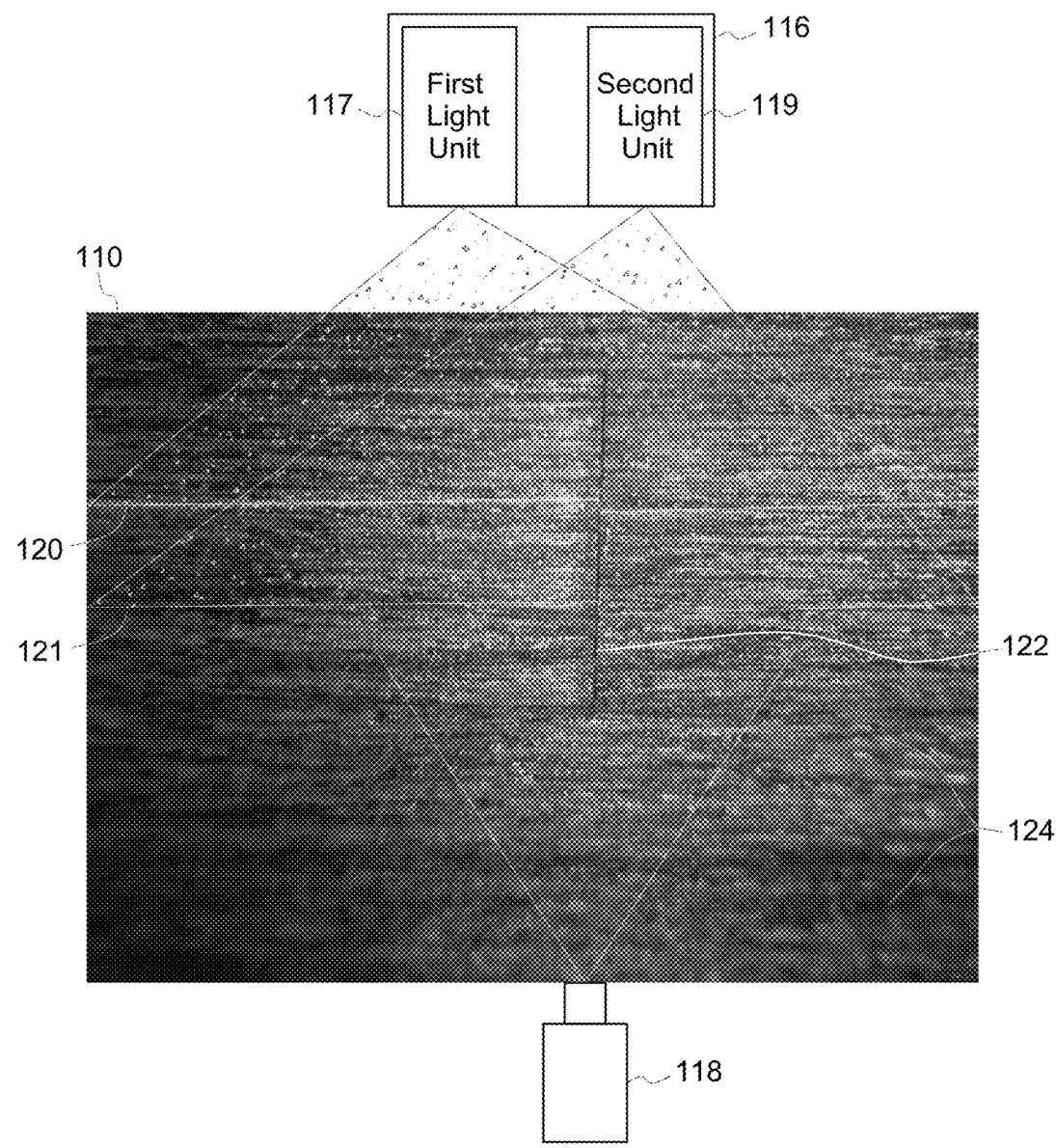
FIG. 5 is a diagrammatical representation of a light source and an image capturing unit projected over a fiber tape, in accordance with another aspect of the present specification.

As illustrated in FIG. 5, the light source 116 may project two lines of light 120, 121 from a first angle so that the two lines of light 120, 121 are aligned to be substantially perpendicular to an expected tape end 122. Particularly, the light source 116 may include a first light unit 117 and a second light unit 119 that are positioned at a predetermined height from the surface of the drum 102. Further, the first light unit 117 may project a first line of light 120, while the second light unit 119 may project a second line of light 121 on the surface of the drum 102. Also, the projected first and second lines of light 120, 121 may be parallel to each other on the surface of the drum 102. In one example, the first line of light 120 and the second line of light 121 may be separated by a predetermined distance on the surface of the drum 102. Also, the first line of light 120 and the second line of light 121 may follow the direction of the tape 110 laid on the drum 102 and may be substantially perpendicular to the expected tape end 122. In one example, the light source 116 may include two laser units to project two laser lights over the tape 110.

Additionally, the image capturing unit 118 is configured to capture an image of the tape 110 from a second angle, as depicted in FIG. 5. In one example, the second angle of the image capturing unit 118 may be substantially orthogonal to the first angle of the projected lines of light 120, 121 on the tape 110. Particularly, the image capturing unit 118 may capture a portion of the surface of the drum 102 that includes the tape 110 that is currently laid down on the drum 102 and one or more other tapes 124 (see FIG. 5) that are previously laid on the surface of the drum 102. These other tapes 124 may be laid at different angles and/or on different layers on the surface of the drum 102.

Figure 6:
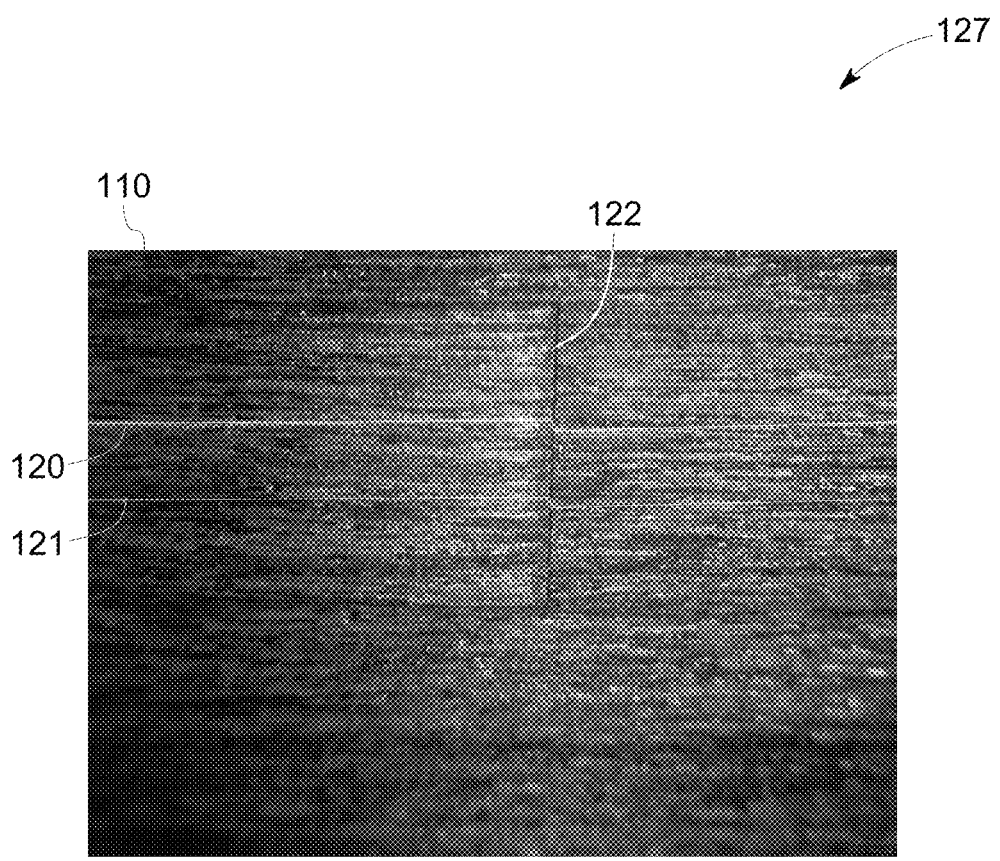
FIG. 6 is a diagrammatical representation of an image captured by the image capturing unit, in accordance with another aspect of the present specification.

Also, as illustrated in FIG. 6, the image 127 captured by the image capturing unit 118 may include the tape 110 having the lines of light 120, 121 projected on the tape 110. In one embodiment, the layup head 104 may send a first signal to the image capturing unit 118 indicating the end of the tape 110 supplied to the compression roller 114. Upon receiving the first signal, the image capturing unit 118 may start to capture the image 127 of the tape 110 on the surface of the drum 102.

After capturing the image 127, the image capturing unit 118 may communicate the captured image 127 to the controller 108. Further, the controller 108 may process the captured image 127 to identify a small shift or discontinuity in the two lines of light 120, 121 on the tape 110 that is laid on the drum 102. The small shift in the lines of light 120, 121 may be mainly at a location where the tape ends.

Figure 7:
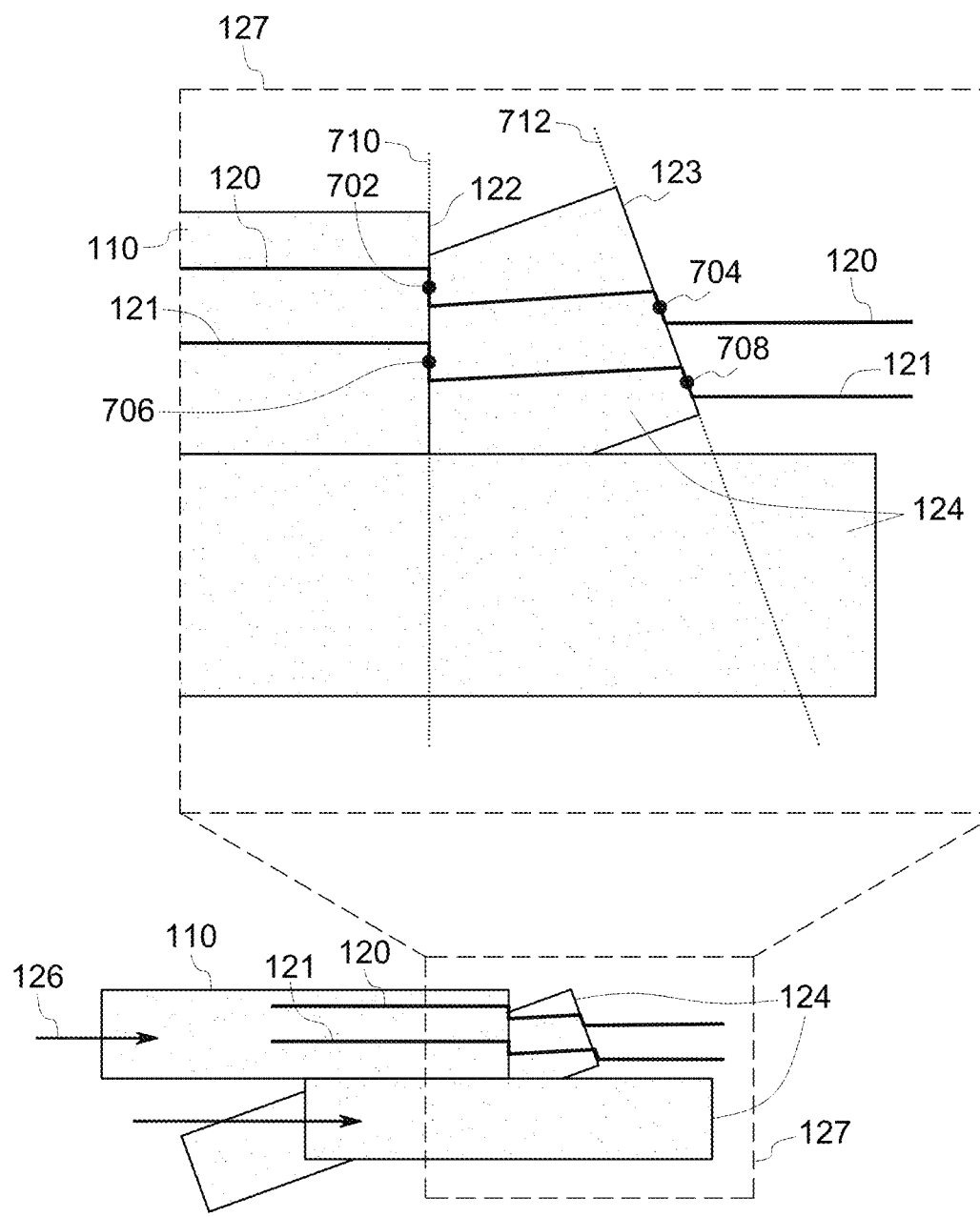
FIG. 7 is a diagrammatical representation of the image depicting other tapes, in accordance with another aspect of the present specification.

In one example, as illustrated in FIG. 7, the captured image 127 may include the tape 110 that is currently laid on the drum 102 and one or more other tapes 124 that are previously laid on the surface of the drum 102 at different angles and/or different layers on the surface of the drum 102. It may be noted that, in FIG. 7, a magnified view of the captured image 127 is depicted at the top for easy review of the features in the image 127.

Further, as the lines of light 120, 121 may pass over the currently laid tape 110 and the other tape 124, the lines of light 120, 121 may have multiple line shifts in the captured image 127, as depicted in FIG. 7. Particularly, in the example of FIG. 7, the lines of light 120, 121 may have line discontinuity or shift at the tape end 122 of the tape 110 and at a tape end 123 of the other tape 124. It may be noted that the lines of light 120, 121 may have multiple line shifts in the captures image 127, and is not limited to two line shifts as depicted in FIG. 7. It is very important to identify the correct tape end 122 among multiple tape ends in the captured image 127. It may be noted that the tape 110 is oriented in a direction 126 on the surface of the drum 102.

In the exemplary second embodiment, the controller 108 may process the captured image 127 to identify the correct tape end 122. Particularly, the controller 108 identifies a plurality of pairs of points that are associated with the discontinuity or line shifts in the two lines of light 120, 121. For example, the first and second lines of light 120, 121 may have their first line shift at a pair of points 702 and 706 in the captured image 127. More specifically, the first line of light 120 may have a line shift at the point 702, while the second line of light 121 may have a line shift at the point 706 in the captured image. Similarly, the first and second lines of light 120, 121 may have their second line shift at a pair of points 704 and 708 in the captured image 127.

Upon identifying the plurality of pairs of points that are associated with the line shifts in the two lines of light 120, 121, the controller 108 may connect each pair of points by a line. For example, the controller 108 may connect the first pair of points 702, 706 with a line 710. Similarly, the controller 108 may connect the second pair of points 704, 708 with a line 712, as depicted in FIG. 7. Thereafter, the controller 108 may verify an angle of each of the lines 710, 712 and a position of each of the lines 710, 712 in the captured image 127 to identify the correct tape end 122. For example, the controller 108 may determine an angle of the second line 712 that connects the second pair of points 704, 708. Further, the controller 108 may verify whether the determined angle of the second line 712 is collinear or parallel to the expected or predetermined orientation of the tape 110. In this case, the second line 712 is at about an angle of 30 degrees to the expected or predetermined orientation of the tape 110. Hence, the controller 108 may eliminate or ignore the second pair of points 704, 708 and its corresponding tape end 123 from the captured image 127.

Furthermore, the controller 108 may verify whether the determined angle of the first line 712 is collinear or parallel to the expected or predetermined orientation of the tape 110. In this case, the first line 710 is a vertical line that is collinear or parallel to the expected or predetermined orientation of the tape 110. Hence, the controller 108 selects the first pair of points 702, 706 for further evaluation. More specifically, the controller 108 further verifies whether the first pair of points 702, 706 is at a first position in the captured image 127. It may be noted that the first position is referred to as a position of the pair of points in the image 127 that is first from the top left of the image 127. As, the first pair of points 702, 706 are in the first position in the image 127, the controller may select the tape end 122 that is associated with this first pair of points 702, 706 as the correct tape end of the currently laid tape 110.

Figure 8:
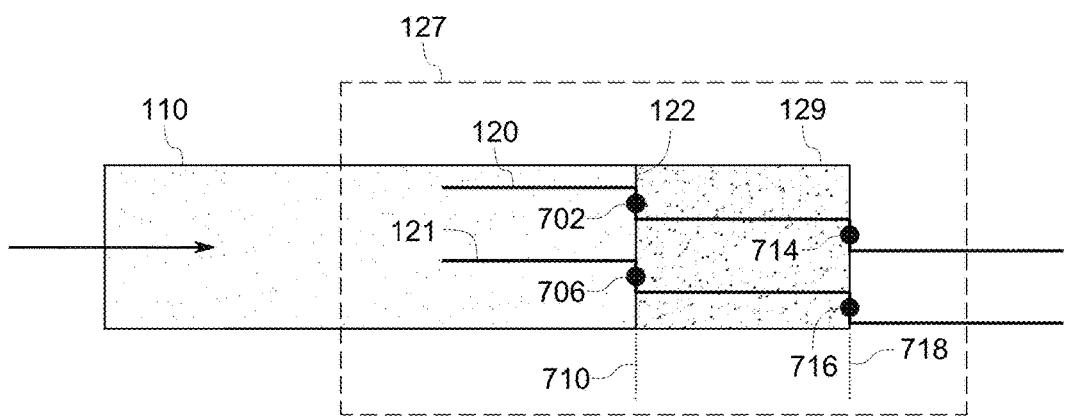
FIG. 8 is a diagrammatical representation of the image depicting overlapping tapes, in accordance with another aspect of the present specification.

In some instance, as illustrated in FIG. 8, the captured image 127 may have two tapes 110 and 129 that are one above the other and are oriented at the same angle on the surface of the drum 102. In this scenario, the first line 710 is associated with the first pair of points 702, 706 and the second line 718 is associated with the second pair of points 714, 716. Though the lines 710, 718 are collinear or parallel to the expected or predetermined orientation of the tape 110, the position of their corresponding pair of points in the image 127 may be different. For example, the first pair of points 702, 706 of the line 710 is at the first position in the image 127, while the second pair of points 714, 716 of the line 718 is at the second position in the image 127. Thus, the controller 108 selects only the first pair of points 702, 706 and determines the tape end 122 that is associated with the first pair of points 702, 706 as the correct tape end.

Figure 9:
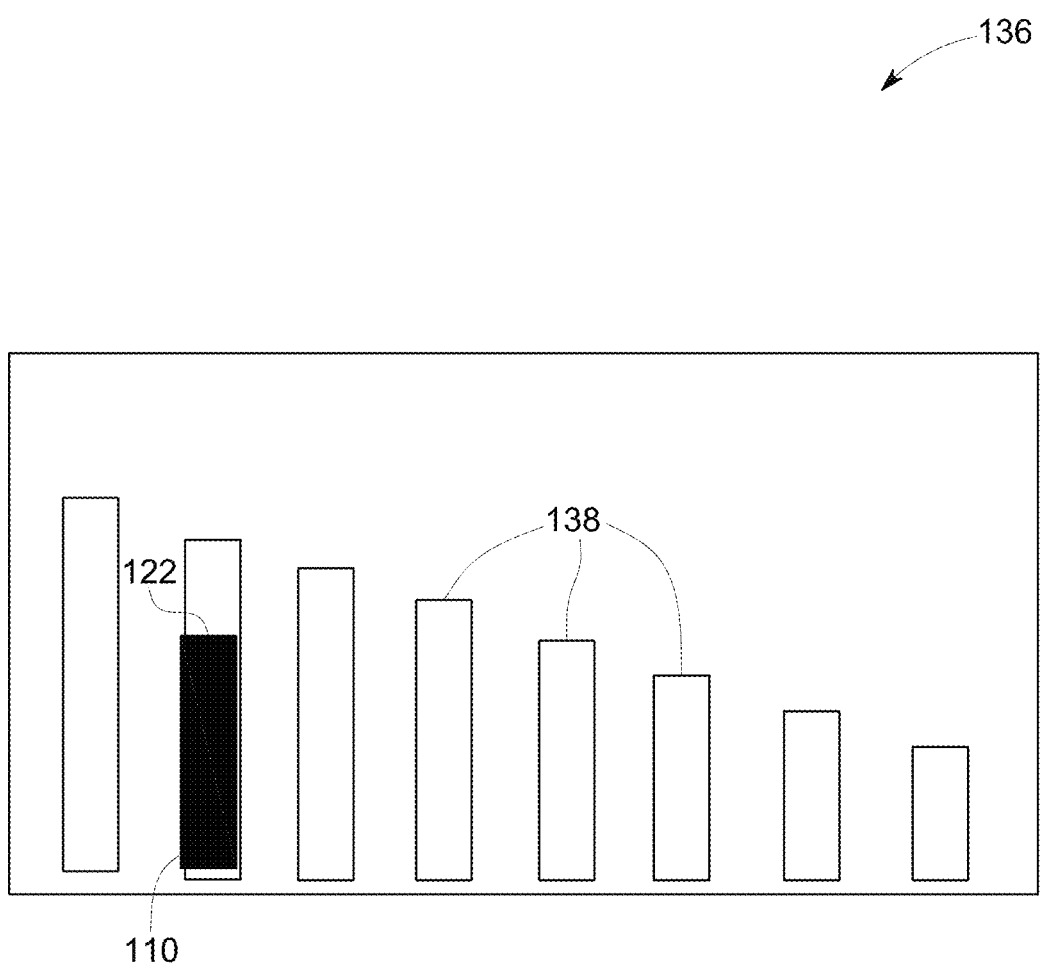
FIG. 9 is an illustration of a chart depicting a predetermined position of the fiber tape, in accordance with aspects of the present specification.

Upon determining the location of the tape end 122, the controller 108 may verify whether the tape end 122 is displaced from a predetermined position on the surface of the drum 102. FIG. 9 illustrates a chart 136 of different predetermined positions or boundaries 138 of the tape 110 on the surface of the drum 102. The controller 108 may verify whether the tape end 122 is positioned within a boundary 138 that is predesigned for fabricating the composite structure. If the tape end 122 is displaced from the predetermined position or boundary 138, the controller 108 may send a second signal to the layup head 104 to cease the layup head 104 from rolling or placing the tape 110 over the surface of the drum 102. Thereafter, the controller 108 may rectify the error in placing the tape 110 on the drum 102, and may restart or continue the layup process. In one example, the controller 108 may verify for an offset in the layup head 104. Further, the controller 108 may rectify the offset and also instructs the operator to remove the tape 110 that is placed at an incorrect position on the surface of the drum 102. After rectification, the controller 108 may continue laying the tape 110 on the surface of the drum 102.

Thus, with the above layup process, end of the composite fiber tape 110 may be automatically identified in a real time. Also, any error in the placement of the tape 110 may be immediately rectified and the layup process may be restarted or continued. Moreover, with the above layup process, the operator is not required to visually inspect for the tape end. Also, as the tape end is identified in a real time, laying one or more layers on the incorrect tape is avoided. This in turn reduces the burden on the operator to peel or remove all the layers that are above the incorrect tape. Also, with the above layup process, the material cost and labour cost for fabricating the composite structure is substantially reduced.

Figure 10:
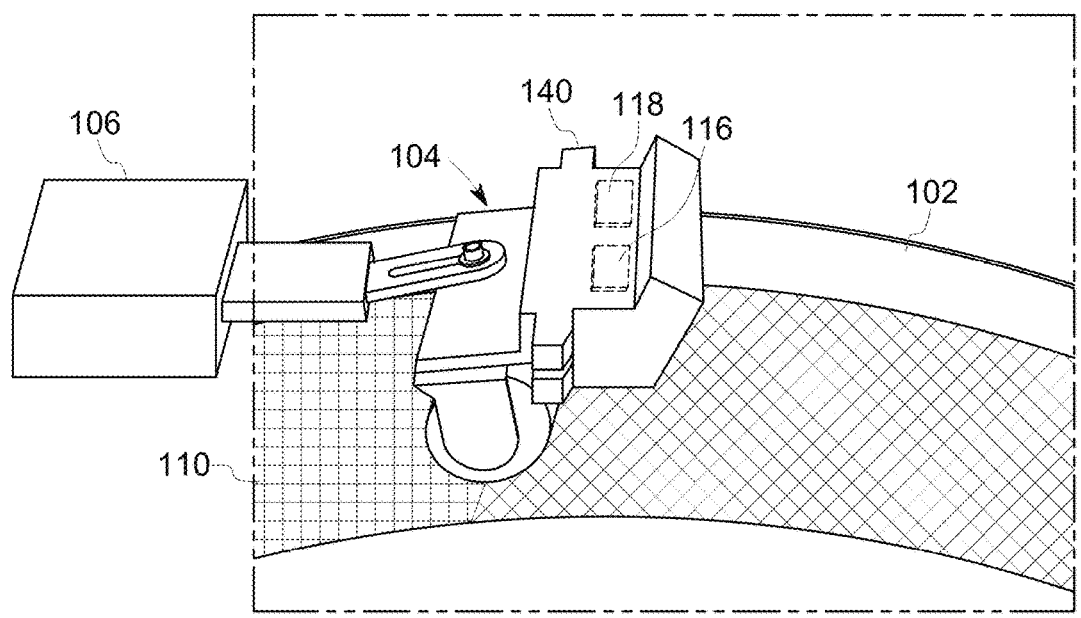
FIG. 10 is a diagrammatical representation of a layup head on a composite structure, in accordance with aspects of the present specification.

Referring to FIG. 10, a diagrammatical representation of the layup head 104 placing tapes 110 over the surface of the drum 102, in accordance with aspects of the present specification, is depicted. The layup head 104 is coupled to the translational platform that is configured to move the layup head 104 along the surface of the drum 102.

Further, the layup head 104 includes a compression roller 114 that is configured to roll the tape 110 over the surface of the drum 102 when the translation platform 106 drives the layup head 104 along the surface of the drum 102. Also, the compressor roller 114 may place the tape 110 over the surface of the drum 102 and may compact the tape against the surface of the drum 102.

In the embodiment of FIG. 10, the layup head 104 includes a light source 116 and an image capturing unit 118 that are enclosed in a housing 140 of the layup head 104. In one example, the housing 140 may be mounted or coupled to the compression roller 114. Further, the light source 116 and the image capturing unit 118 are positioned proximate to the surface of the drum 102. Further, the light source 116 is configured to project a line of light at a first angle that is substantially perpendicular to the expected end of the tape 110. Similarly, the image capturing unit 118 is configured to capture an image of the tape 110 on the surface of the drum 102 from a second angle that is substantially perpendicular to the first angle of the line of light. Furthermore, the captured images may be communicated to the controller 108 for determining the placement of the tape 110 on the surface of the drum 102. In one example, the light source 116 and the image capturing unit 118 may be wirelessly communicated to the controller 108.

Figure 11:
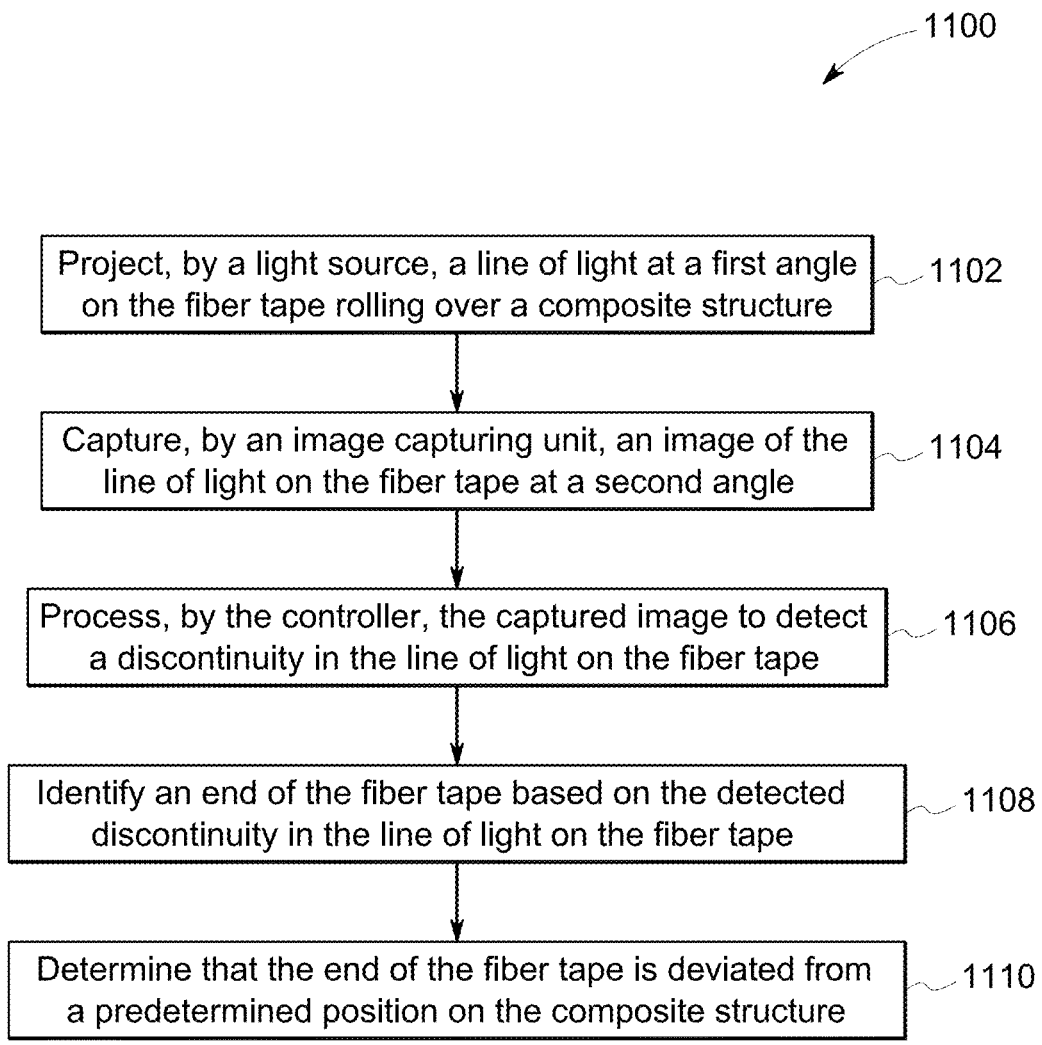
FIG. 11 is a flow chart illustrating a method for identifying the end of the fiber tape using a single line of light, in accordance with aspects of the present specification.

Referring to FIG. 11, a flow chart illustrating a method for identifying an end of a fiber tape on a composite structure, in accordance with one embodiment or first embodiment of the present specification is depicted. For ease of understanding, the method 1100 is described with reference to the components of FIGS. 1-10. The method begins at step 1102, where a line of light 120 is projected at a first angle on the fiber tape 110 that is rolled over the drum or the composite structure 102. To that end, a light source 116 that is mounted on a layup head 104 is used to project the line of light 120 on the fiber tape 110 as the fiber tape 110 is being laid by the layup head 104 on the surface of the drum 102. In one embodiment, the line of light is aligned to be substantially perpendicular to an expected tape end 122. It may be noted that the terms "drum" and "composite structure" may be used interchangeably.

Subsequently, at step 1104, an image of the line of light 120 on the fiber tape 110 is captured at a second angle. Particularly, an image capturing unit 118 that is positioned proximate to the surface of the drum 102 is used to capture the image having the line of light on the fiber tape 110. In one embodiment, the compression roller 114 may send a first signal to the image capturing unit 118 indicating the end of the tape 110 supplied to the compression roller 114. Upon receiving the first signal, the image capturing unit 118 may initiate to capture the image 126 of the tape 110 on the surface of the drum 102. Thereafter, the image capturing unit 118 sends the captured image 126 to the controller 108.

Furthermore, at step 1106, the controller 108 may process the captured image to detect a discontinuity or shift in the line of light 120 on the fiber tape 110. Particularly, the controller 108 may process the image 128 to determine intensity of pixel values associated with the line of light 120 on the tape 110. Further, the controller 108 may monitor the intensity of pixel values along the line of light 120 on the tape 110. As the intensity of pixel values along the line of light 120 changes substantially, the controller 108 detects the discontinuity in the line of light 120.

In addition, at step 1108, the controller 108 may identify an end of the fiber tape 110 based on the detected discontinuity in the line of light 120. To that end, the controller 108 may determine a location in the image 128 having the detected discontinuity in the line of light 120. This location in the image 128 is identified as a location of the end of the tape 108 on the surface of the drum 102.

Subsequently, at step 1110, the controller 108 may verify whether the end of the fiber tape 110 is deviated from a predetermined position on the surface of the drum 102. If the end of the fiber tape 110 is deviated from the predetermined position, the controller 108 may send a second signal to the layup head 104 to cease the layup head 104 from rolling the fiber tape 110 over the surface of the drum 102. Thereafter, the controller 108 may rectify the error in placing the tape 110 on the drum 102, and may restart or continue the layup process.

Figure 12:
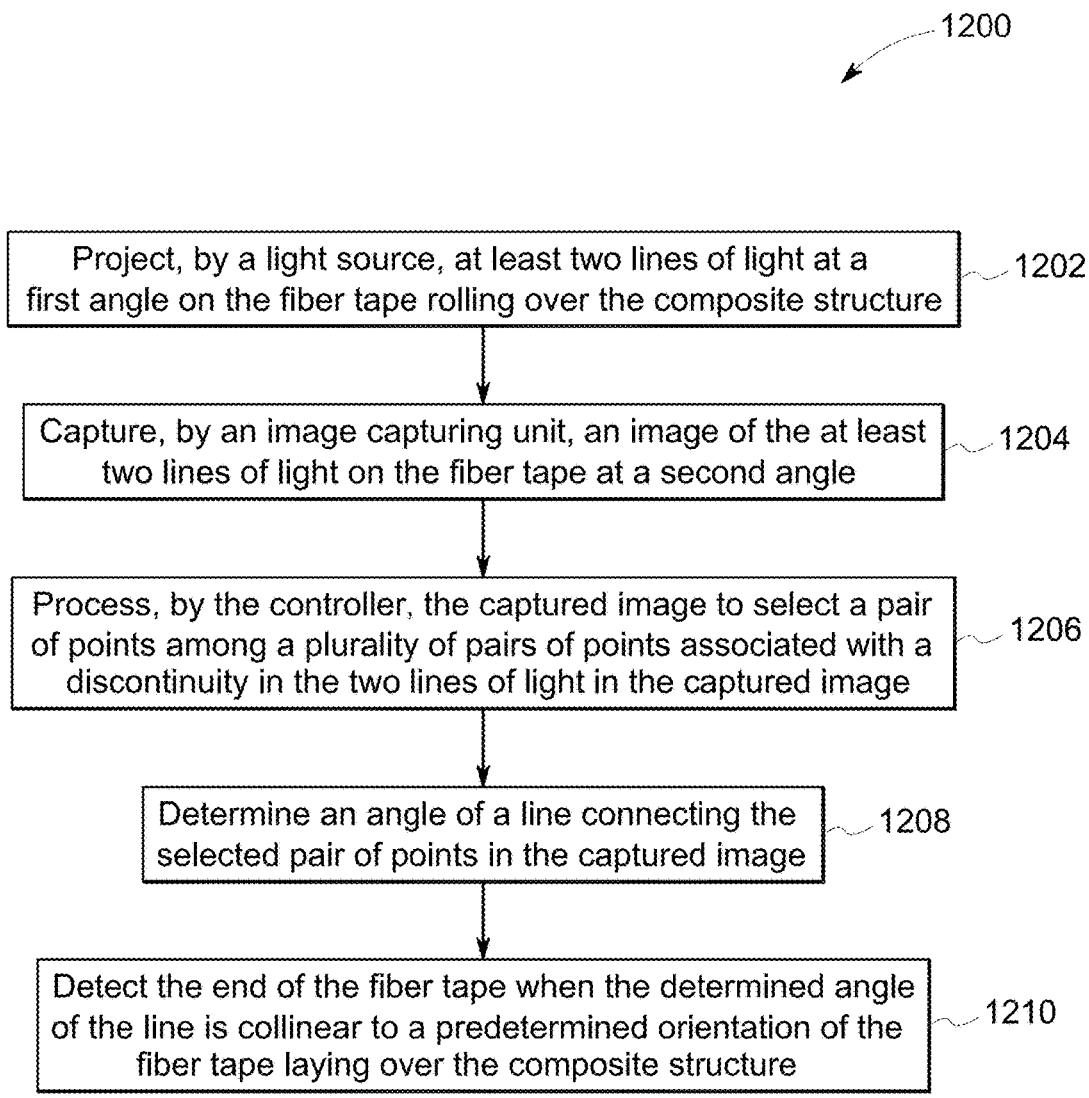
FIG. 12 is a flow chart illustrating a method for identifying the end of the fiber tape using multiple lines of light, in accordance with another aspect of the present specification.

Referring to FIG. 12, a flow chart illustrating a method for identifying an end of a fiber tape on a composite structure in accordance with another embodiment or second embodiment of the present specification is depicted. For ease of understanding, the method 1200 is described with reference to the components of FIGS. 1-10. The method begins at step 1202, where at least two lines of light 120, 121 are projected at a first angle on the fiber tape 110 that is rolled over the drum or the composite structure 102. To that end, a light source 116 that is mounted on a layup head 104 includes a first light unit 117 and a second light unit 119 that are used to project the lines of light 120, 121 on the fiber tape 110 as the fiber tape 110 is being laid by the layup head 104 on the surface of the drum 102. In one embodiment, the lines of light 120, 121 are aligned to be substantially perpendicular to an expected tape end 122. It may be noted that the terms "drum" and "composite structure" may be used interchangeably.

Subsequently, at step 1204, an image of the lines of light 120, 121 on the fiber tape 110 is captured at a second angle. Particularly, an image capturing unit 118 that is positioned proximate to the surface of the drum 102 is used to capture the image having the lines of light 120, 121 on the fiber tape 110. In one embodiment, the compression roller 114 may send a first signal to the image capturing unit 118 indicating the end of the tape 110 supplied to the compression roller 114. Upon receiving the first signal, the image capturing unit 118 may initiate to capture the image 127 of the tape 110 on the surface of the drum 102. Thereafter, the image capturing unit 118 sends the captured image 127 to the controller 108.

Furthermore, at step 1206, the controller 108 may process the captured image 127 to select a pair of points among a plurality of pairs of points associated with a discontinuity in the two lines of light 120, 121 in the captured image. For example, as depicted in FIG. 7, the first and second lines of light 120, 121 may have their first line shift at a pair of points 702 and 706 in the captured image 127. More specifically, the first line of light 120 may have a line shift at the point 702, while the second line of light 121 may have a line shift at the point 706 in the captured image. Similarly, the first and second lines of light 120, 121 may have their second line shift at a pair of points 704 and 708 in the captured image 127. The controller 108 may select one pair of points 702, 706 for further processing of the image 127.

In addition, at step 1208, the controller 108 may determine an angle of a line connecting the selected pair of points in the captured image. For example, the controller 108 may connect the first pair of points 702, 706 with a line 710. The first pair of points is associated with the tape end or edge 122. Further, the controller 108 may determine an angle of this line 710.

Subsequently, at step 1210, the controller 108 may detect the end of the fiber tape when the determined angle of the line is collinear to a predetermined orientation of the fiber tape laying over the composite structure. Particularly, the controller 108 may verify whether the determined angle of the first line 712 is collinear or parallel to the expected or predetermined orientation of the tape 110. If the determined angle of the first line 712 is collinear or parallel to the expected or predetermined orientation of the tape 110, the controller 108 may further verify whether the first pair of points 702, 706 associated with the first line 710 is at a first position in the captured image 127. If the first pair of points 702, 706 associated with the first line 710 is at a first position in the captured image 127, the controller 108 may select the tape end 122 that is associated with this first pair of points 702, 706 as the correct tape end of the currently laid tape 110. Otherwise, the controller 108 may eliminate or ignore this tape edge 122, and my process other pair of points to verify other ends or edges in the image 127.

Also, the controller 108 may verify whether the end 122 of the fiber tape 110 has deviated from a predetermined position on the surface of the drum 102. If the end 122 of the fiber tape 110 has deviated from the predetermined position, the controller 108 may send a second signal to the layup head 104 to cease the layup head 104 from rolling the fiber tape 110 over the surface of the drum 102. Thereafter, the controller 108 may rectify the error in placing the tape 110 on the drum 102, and may restart or continue the layup process.

The various embodiments of the exemplary system and method aid in automatically identifying the end of the fiber tape on the surface of the composite structure. This in turn prevents the operator from manually inspecting for the tape end. Also, as the tape end is identified in a real time, laying one or more layers on the incorrect tape is avoided. This in turn reduces the burden on the operator to peel or remove all the layers that are above the incorrect tape. Also, with the above layup process, the material cost and labour cost for fabricating the composite structure is substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A device for identifying an end of a fiber tape rolling over a composite structure, the device comprising:
   a light source disposed proximate to the composite structure and configured to project a line of light at a first angle on the fiber tape rolling over the composite structure;
   an image capturing unit disposed proximate to the composite structure and configured to capture an image of the fiber tape having the line of light, wherein the image is captured at a second angle;
   a controller coupled to the image capturing unit and configured to:
      process the captured image to detect a discontinuity in the line of light on the fiber tape if the line of light fits to a line of a predetermined orientation of the fiber tape over the composite structure; and
      identify the end of the fiber tape based on the detected discontinuity in the line of light on the fiber tape; and
   a layup head operatively coupled to the image capturing unit and configured to roll the fiber tape over the composite structure, wherein the layup head is further configured to send a first signal to the image capturing unit to indicate the end of the fiber tape, and wherein the image capturing unit is further configured to capture the image of the fiber tape having the line of light when the first signal is received from the layup head.

2. The device of claim 1, wherein the controller is configured to:
   determine that the end of the fiber tape is displaced from a predetermined position on the composite structure; and
   send a second signal to the layup head to cease the layup head from rolling the fiber tape over the composite structure.

3. The device of claim 1, wherein the line of light is substantially perpendicular to the end of the fiber tape.

4. A device for identifying an end of a fiber tape rolling over a composite structure, the device comprising:
   a light source disposed proximate to the composite structure and configured to project at least two lines of light at a first angle on the fiber tape rolling over the composite structure;
   an image capturing unit disposed proximate to the composite structure and configured to capture an image of the fiber tape having at least two lines of light, wherein the image is captured at a second angle;
   a controller coupled to the image capturing unit and configured to:
      process the captured image to select a pair of points among a plurality of pairs of points associated with a discontinuity in the at least two lines of light in the captured image;
      determine an angle of a line connecting the selected pair of points in the captured image; and
      detect the end of the fiber tape when the determined angle of the line is collinear to a predetermined orientation of the fiber tape laying over the composite structure; and
   a layup head operatively coupled to the image capturing unit and the light source and configured to lay the fiber tape at the predetermined orientation over the composite structure, wherein the layup head is further configured to send a first signal to the image capturing unit to indicate the end of the fiber tape, and wherein the image capturing unit is further configured to capture the image of the the fiber tape having the at least two lines of light when the first signal is received from the layup head.

5. The device of claim 4, wherein the end of the fiber tape is detected when the selected pair of points is at a first position in the captured image.

6. The device of claim 4, wherein the selected pair of points comprises a first point and a second point, wherein the first point is associated with one of the at least two lines of light and the second point is associated with other of the at least two lines of light.

7. The device of claim 4, wherein the at least two lines of light is substantially perpendicular to the end of the fiber tape.

* * * * *